(12) United States Patent
Kim et al.

(10) Patent No.: US 9,373,847 B2
(45) Date of Patent: Jun. 21, 2016

(54) RECHARGEABLE BATTERY

(75) Inventors: Jin-Kyoo Kim, Yongin-si (KR);
Tae-Young Ko, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 1154 days.

(21) Appl. No.: 13/167,179

(22) Filed: Jun. 23, 2011

(65) Prior Publication Data
US 2011/0318633 A1 Dec. 29, 2011

(30) Foreign Application Priority Data

Jun. 23, 2010 (KR) ........................ 10-2010-0059731

(51) Int. Cl.
*H01M 4/04* (2006.01)
*H01M 4/70* (2006.01)
*H01M 4/66* (2006.01)
*H01M 2/26* (2006.01)

(52) U.S. Cl.
CPC ................ *H01M 4/661* (2013.01); *H01M 2/26* (2013.01); *H01M 4/70* (2013.01)

(58) Field of Classification Search
CPC ........... H01M 2/26; H01M 2/30; H01M 4/70; H01M 4/661; H01M 4/00; H01M 4/02; H01M 4/04; H01M 4/43; H01M 10/04; H01M 10/045; Y02E 60/12
USPC .......................... 429/163, 178, 209, 211, 240
See application file for complete search history.

(56) References Cited

U.S. PATENT DOCUMENTS

| | | | |
|---|---|---|---|
| 4,098,966 A * | 7/1978 | Brown | 429/161 |
| 2004/0126648 A1 * | 7/2004 | Kang et al. | 429/57 |
| 2004/0161662 A1 * | 8/2004 | Kim et al. | 429/94 |
| 2005/0221178 A1 * | 10/2005 | Kim | 429/211 |
| 2006/0008702 A1 | 1/2006 | Cheon et al. | |
| 2008/0206640 A1 | 8/2008 | Shibata et al. | |
| 2011/0151295 A1 * | 6/2011 | Kim | 429/94 |
| 2011/0151318 A1 * | 6/2011 | Lee et al. | 429/163 |

FOREIGN PATENT DOCUMENTS

| | | |
|---|---|---|
| JP | 2001-176489 | 6/2001 |
| KR | 10 2004-0059303 A | 7/2004 |
| KR | 10 2005-0121905 A | 12/2005 |
| KR | 10 2008-0079200 A | 8/2008 |
| KR | 10-2008-0095612 A | 10/2008 |
| KR | 10-2009-0045388 A | 5/2009 |

OTHER PUBLICATIONS

Korean Notice of Allowance in KR 10-2010-0059731, dated Jun. 4, 2012 (Kim, et al.).

* cited by examiner

*Primary Examiner* — Carlos Barcena
(74) *Attorney, Agent, or Firm* — Lee & Morse, P.C.

(57) ABSTRACT

A rechargeable battery, including a first electrode including a first metal plate, a first coated region where a first material is applied onto the first metal plate, and a first uncoated region, the first metal plate having a first thickness in the first uncoated region and a second thickness in the first coated region, the first thickness being greater than the second thickness, a second electrode including a second metal plate, a second coated region where a second material is applied onto the second metal plate, and a second uncoated region, a separator between the first electrode and the second electrode, a case housing the first electrode, the separator, and the second electrode, and a current collecting plate connected to the first uncoated region through a side thereof.

6 Claims, 8 Drawing Sheets

RECHARGEABLE BATTERY

BACKGROUND

1. Field

Embodiments relate to a rechargeable battery.

2. Description of the Related Art

Rechargeable batteries can be repeatedly charged and discharged, and include low-capacity rechargeable batteries and high-capacity rechargeable batteries. The high-capacity rechargeable battery may be constituted by a plurality of cells connected to each other in a pack, and may be used for a power supply for driving a motor of an electric vehicle, or the like.

The above information disclosed in this Background section is only for enhancement of understanding of the background of the described technology and therefore it may contain information that does not form the conventional art that is already known to a person of skill in the art.

SUMMARY

An example embodiment is directed to a rechargeable battery, including a first electrode including a first metal plate, a first coated region where a first material is applied onto the first metal plate, and a first uncoated region, the first metal plate having a first thickness in the first uncoated region and a second thickness in the first coated region, the first thickness being greater than the second thickness, a second electrode including a second metal plate, a second coated region where a second material is applied onto the second metal plate, and a second uncoated region, a separator between the first electrode and the second electrode, a case housing the first electrode, the separator, and the second electrode, and a current collecting plate connected to the first uncoated region through a side thereof.

The first uncoated region may be formed by folding a part of the first metal plate at the outer end of the first uncoated region.

The first metal plate of the first coated region may be in a single layer, and the first metal plate of the first uncoated region may be in two layers.

The first uncoated region may extend from the end of the first metal plate to the separator by a distance set in a width direction of the first electrode, and the first uncoated region may be formed by a plurality of layers in which the first metal plate is folded and overlapped along the length direction of the first electrode.

A required gap may be set, the required gap being required between an inner surface of the case and an electrode assembly with an uncoated region having a third thickness equal to the first metal plate, a required width of the uncoated region having the third thickness may be set, the required width being required when welding the uncoated region having the third thickness and the current collecting plate, and the first coated region may be formed within the required width.

The first uncoated region having the first thickness may have a width less than the required width.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Korean Patent Application No. 10-2010-0059731, filed on Jun. 23, 2010, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
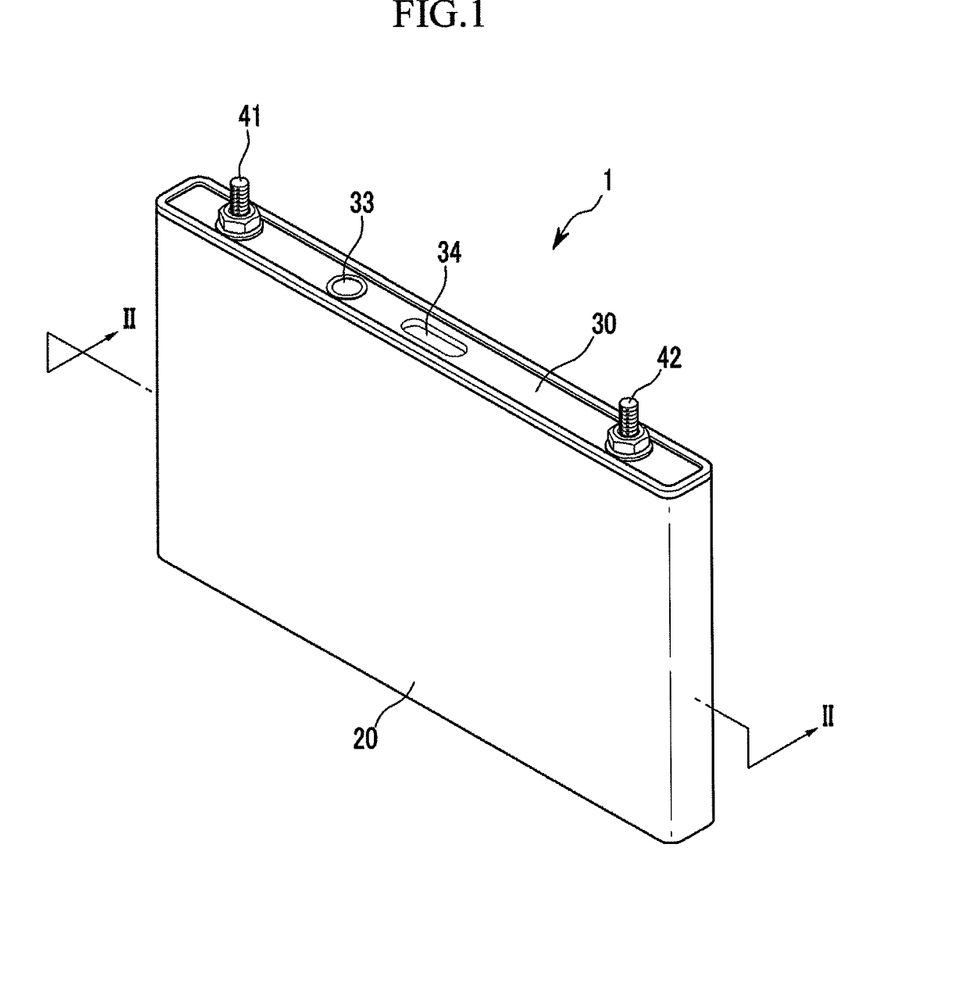
FIG. 1 illustrates a perspective view of a rechargeable battery according to an example embodiment.
Figure 2:
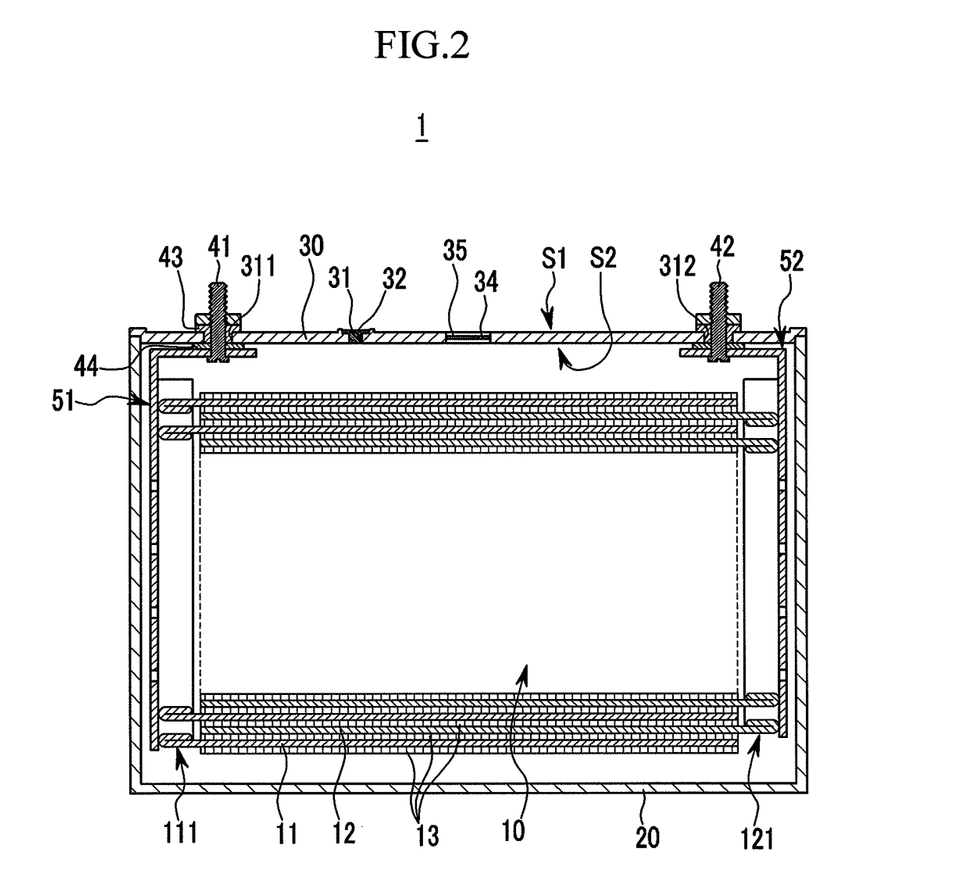
FIG. 2 illustrates a cross-sectional view taken along line II-II of FIG. 1.
Figure 3:
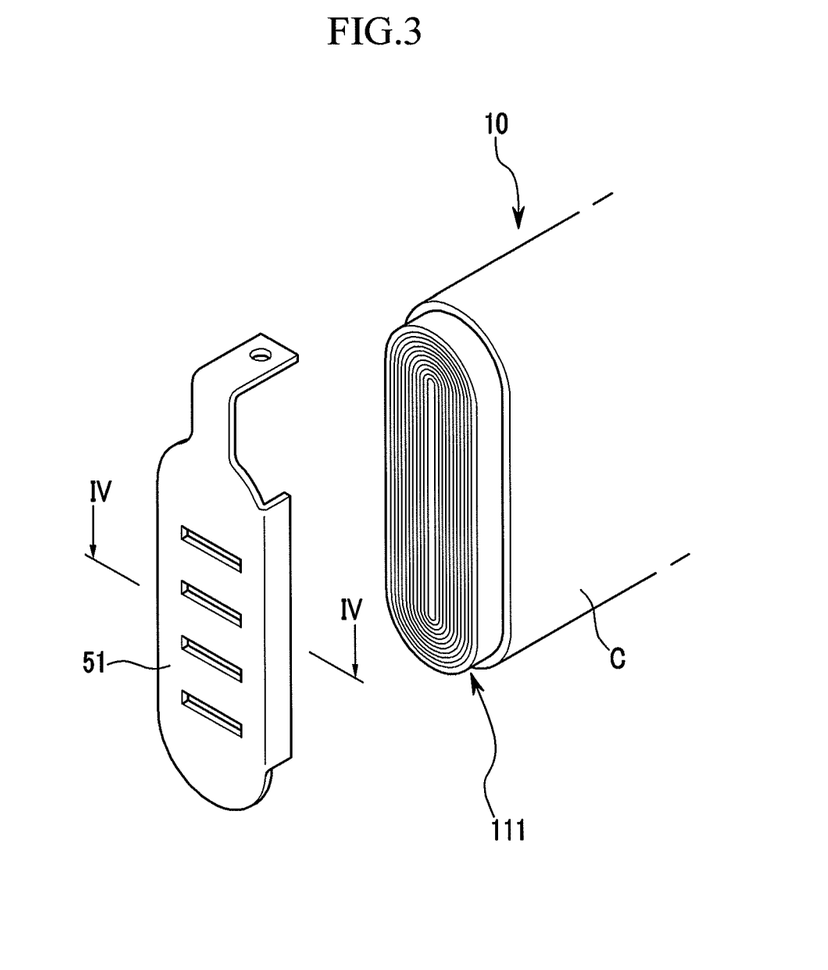
FIG. 3 illustrates an exploded perspective view of an electrode assembly and a current collecting plate of FIG. 2.

FIG. 1 illustrates a perspective view of a rechargeable battery 1 according to an example embodiment. FIG. 2 illustrates a cross-sectional view taken along line II-II of FIG. 1. FIG. 3 illustrates an exploded perspective view of an electrode assembly and a current collector of FIG. 2. Referring to FIGS. 1-3, the rechargeable battery 1 may include a case 20 housing an electrode assembly 10, a cap plate 30 sealing an opening formed at a side of the case 20, a positive electrode terminal 41 and a negative electrode terminal 42 installed at terminal holes 311 and 312 of the cap plate 30, and current collecting plates 51 and 52 connecting the positive and negative electrode terminals 41 and 42, respectively, to the electrode assembly 10.

The electrode assembly 10 may have a separator 13, e.g., an insulator, and a first electrode (hereinafter, referred to as "positive electrode") 11 and a second electrode (hereinafter, referred to as "negative electrode") 12 that are disposed on both surfaces of the separator 13. The electrode assembly 10 may be formed by winding the positive electrode 11, the negative electrode 12, and the separator 13, e.g., in a jelly roll configuration.

Figure 4:
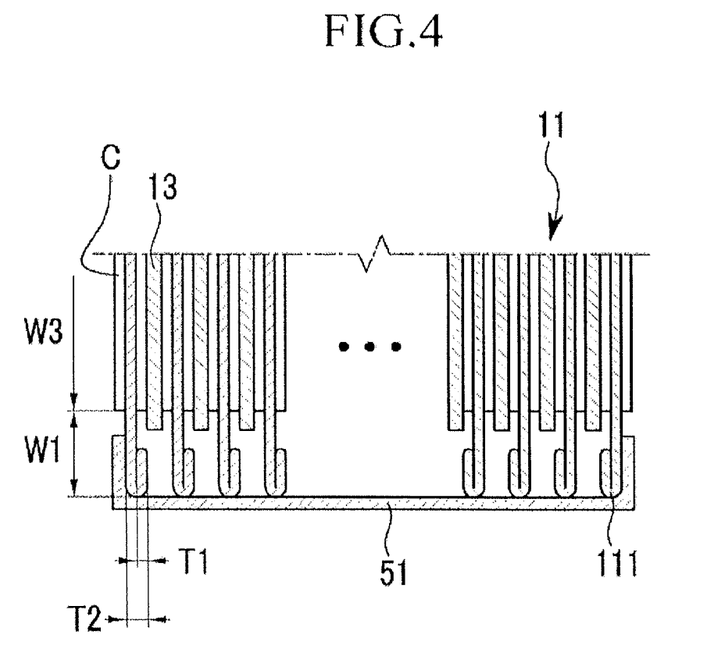
FIG. 4 illustrates a partial cross-sectional view taken along line IV-IV of FIG. 3.

FIG. 4 illustrates a partial cross-sectional view taken along line IV-IV of FIG. 3. Referring to FIG. 4, in the positive and negative electrodes 11 and 12, the current collectors may have a predetermined thickness T1 in respective coated regions thereof. In the positive and negative electrodes 11 and 12, the first and second uncoated regions 111 and 121 may be shaped to have a thickness T2 greater than the thickness T1 of the current collectors in the coated regions. Thus, the masses of the first and second uncoated regions 111 and 121 may be increased in regions welded to the current collecting plates 51 and 52. Therefore, the first and second uncoated regions 111 and 121 and the current collecting plates 51 and 52 may be welded to each other while being closely bonded to each other. Thus, weldability may be improved. A laser beam irradiated during welding may be blocked in the first and second uncoated regions 111 and 121 which become thicker. Thus, damage to the separator 13 may be reduced or eliminated.

The first and second uncoated regions 111 and 121 may have thicknesses T2 greater than the thickness T1 of the current collector so as to be closely welded to the current collecting plates 51 and 52. Thus, comparing a first case (in which a comparative uncoated region having a thickness equal to the thickness of T1 of the current collector is welded to the current collecting plate) to a second case according to the present example embodiment (in which the first and second uncoated regions 111 and 121 have the thickness T2 greater than the thickness T1 of the current collector are welded to the current collecting plates 51 and 52), if the same welding operation is implemented, width W1 of the first uncoated region 111 (and corresponding width W2 of the second uncoated region 121, see FIG. 7) may be decreased in the second case according to the present example embodiment. As a result, in the positive and negative electrodes 11 and 12, the width W3 of the coated region C coated with the active material may be increased. Accordingly, the rechargeable battery 1 may be implemented with a high-energy density.

In the present example embodiment, the first and second uncoated regions 111 and 121 may be have thicknesses greater than the thickness T1 of the current collector as a result of shaping or bending a part of the respective current collector at the outer ends of the first and second uncoated regions 111 and 121.

Figure 5:
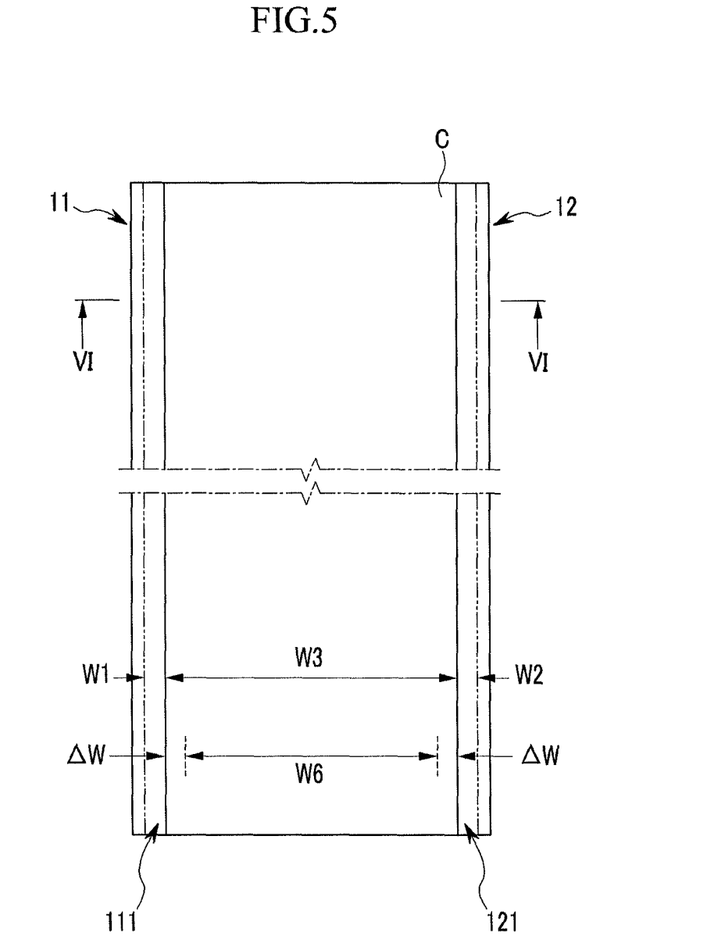
FIG. 5 illustrates a plan view of positive and negative electrodes.

FIG. 5 illustrates a plan view of the positive and negative electrodes 11 and 12. Referring to FIG. 5, the first and second uncoated regions 111 and 121 retreat to the coated region C by a distance set in the width direction of the positive and negative electrodes 11 and 12, i.e., in the horizontal direction in FIG. 5, at the ends of the first and second uncoated regions 111 and 121.

The first and second uncoated regions 111 and 121 may be shaped or formed in multiple layers in which the respective current collector is folded and overlapped along the length direction of the positive and negative electrodes 11 and 12, i.e., along the vertical direction in FIG. 5, while interposing separators therebetween (separators are not shown in FIG. 5).

Figure 6:
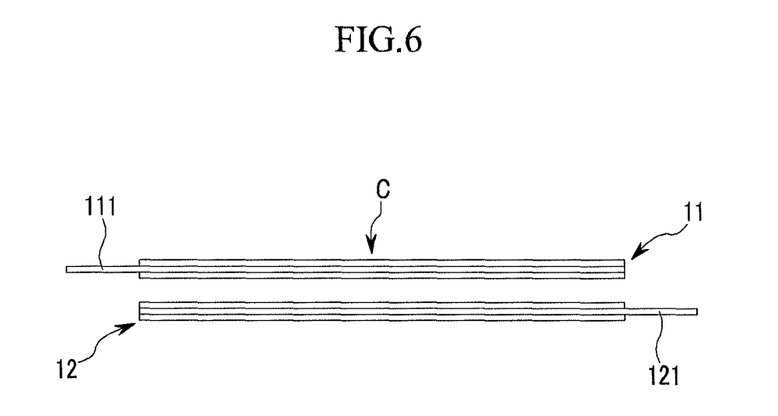
FIG. 6 illustrates a cross-sectional view corresponding to line VI-VI of FIG. 5.
Figure 7:
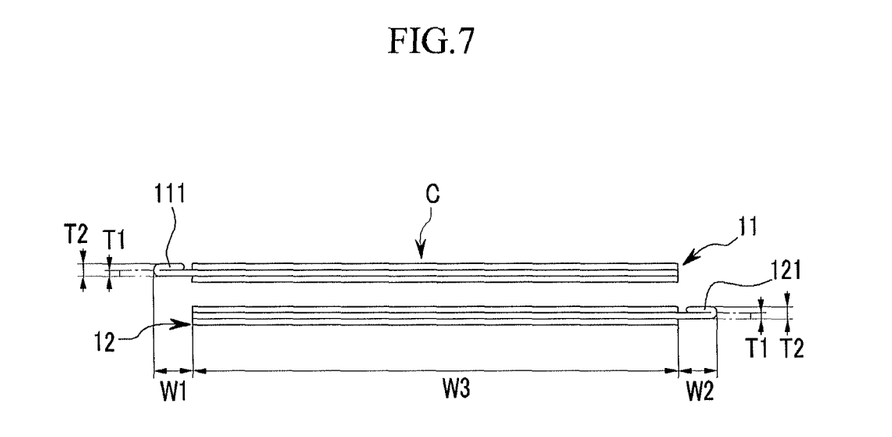
FIG. 7 illustrates a cross-sectional view of uncoated regions that are bent in the electrode of FIG. 5.

In FIG. 5, a two-dot chain line indicates a change in width of an electrode before shaping (see FIG. 6) as compared to after rolling (see FIG. 7). A width W6 of a coated region of a comparative electrode, and a change amount ΔW of the width of a comparative coated region, are described below in connection with FIGS. 9(a) and 9(b).

In the present example embodiment, the first and second uncoated regions 111 and 121 may be formed as two layers by folding once the current collectors of the positive and negative electrodes 11 and 12 that are formed in a single layer, or may be formed as more layers by folding the corresponding current collectors two times or more. In the case in which the thickness T1 of the current collector is constant, the density of the first and second uncoated regions 111 and 121 may be further increased by increasing the number of times of folding the first and second uncoated regions 111 and 121.

FIG. 6 illustrates a cross-sectional view corresponding to line VI-VI of FIG. 5, and FIG. 7 illustrates a cross-sectional view of uncoated regions that are bent in the electrodes of FIG. 5. Referring to FIGS. 2, 5, 6, and 7, the positive electrode 11 and the negative electrode 12 may include respective first and second metal plates (herein, commonly referred to as the current collector) made of a thin-film metallic foil, and may include first and second respective materials (herein, commonly referred to as the active material) with which the surface of the current collector is coated.

As shown in FIGS. 6 and 7, the positive electrode 11 and the negative electrode 12 may have a coated region C (in which the current collector is coated with an active material) and respective first and second uncoated regions 111 and 121 (in which the current collector is not coated with the active material). The coated region C may occupy most of each of areas of the positive electrode 11 and the negative electrode 12.

The first and second uncoated regions 111 and 121 may be formed on both width-direction ends of the positive and negative electrodes 11 and 12, that is, disposed on both ends of the coated region C of the electrode assembly 10, respectively, in a jelly roll state. For example, the electrode assembly 10 may include a front surface and a rear surface having a large area in the jelly roll state and a left surface and a right surface having a shape corresponding to a substantially rectangular parallelepiped forming a narrow and long area as the ends of the first and second uncoated regions 111 and 121 (see FIG. 3).

Referring to FIG. 7, in the positive and negative electrodes 11 and 12, the first and second uncoated regions 111 and 121 have a thickness T2 greater than the thickness T1 of the current collector having a predetermined thickness.

Referring back to FIGS. 1 and 2, the case 20 may have an overall appearance of the rechargeable battery 1. The case 20 may be made of, e.g., a conductive metal such as aluminum, an aluminum alloy, steel plated with nickel, etc. The case 20 may form a space housing the electrode assembly 10. For example, the case 20 may have a rectangular parallelepiped angular shape having an opening at one side thereof to receive the electrode assembly 10 having a shape corresponding to the rectangular parallelepiped. The exemplified opening faces upwards in the case 20 in FIG. 1.

The cap plate 30 may be made of a thin plate material and may be coupled to the opening of the case 20 to seal the case 20. The cap plate 30 may be formed to block an outer part and an inner part of the case 20 from each other and, further, as necessary, the cap plate 30 may be formed to connect the outer part and the inner part to each other. The cap plate 30 may include components enabling the formation and operation of the rechargeable battery 1, e.g., terminal holes 311 and 312 extracting positive and negative electrode terminals 41 and 42, respectively, an electrolyte solution inlet 32 for injecting an electrolyte solution, and a vent hole 35 for securing the stability of the rechargeable battery 1 when the internal pressure of the rechargeable battery 1 increases.

The terminal holes 311 and 312 may allow the positive and negative electrode terminals 41 and 42 to be inserted into the case 20 through the cap plate 30. The positive and negative electrode terminals 41 and 42 may be electrically connected to the positive electrode 11 and the negative electrode 12 of the electrode assembly 10, respectively in the case 20 through the terminal holes 311 and 312 to extract the positive electrode 11 and the negative electrode 12, respectively to the outside.

In an implementation, the positive and negative electrode terminals 41 and 42 may be installed in the terminal holes 311 and 312 through an outer insulator 43 and an inner insulator 44, respectively. The outer insulator 43 and the inner insulator 44 may form an electrically insulating structure between the positive electrode terminal 41 and the cap plate 30, and between the negative electrode terminal 42 and the cap plate 30. The structures of the inner insulator 44 and the outer insulator 43 installed in the terminal hole 311 may have the same structures of the inner insulator 44 and the outer insulator 43 installed in the terminal hole 312. For convenience, hereinafter, the terminal hole 311 in which the positive electrode terminal 41 is installed will be described as an example.

The outer insulator 43 may be located on an outer surface S1 of the cap plate 30 and partially inserted into the terminal hole 311 to electrically insulate the positive electrode terminal 41 and the cap plate 30 from each other. The outer insulator 43 may electrically insulate an outer circumferential surface of the positive electrode terminal 41 and the outer surface S1 of the cap plate 30 from each other, and electrically insulates an outer circumferential surface of the positive electrode terminal 41 and an inner circumferential surface of the terminal hole 311 facing the outer surface of the positive electrode terminal 41 from each other.

The inner insulator 44 may be in surface contact with an inner surface S2 of the cap plate 30 to electrically insulate the cap plate 30 around the terminal hole 311 and a current collecting plate 51 facing the cap plate 30 from each other. The inner insulator 44 may electrically insulate the top of the current collecting plate 51 and the inner surface S2 of the cap plate 30 from each other, and electrically insulate the outer circumferential surface of the positive electrode terminal 41 and an inner surface of the cap plate 30 facing the outer surface of the positive electrode terminal 41 from each other.

The electrolyte solution inlet 32 may allow the electrolyte solution to be injected into the case 20 while the cap plate 30 is coupled to the case 20. After the electrolyte solution is injected into the case 20, the electrolyte solution inlet 32 may be sealed with a sealing plug 33.

When the rechargeable battery 1 is normally operated, the vent hole 35 maintains a closed state and is sealed with the vent plate 34 so as to be opened when internal pressure increases. The vent plate 34 may be made of a plate material that is thinner than the cap plate 30 to be bonded to the vent hole 35. The vent plate 34 may be cut or burst by the internal pressure to discharge gas in an inner part of the rechargeable battery 1 when the internal pressure of the case 20 increases to a predetermined value or more by gas generated from the inner part of the rechargeable battery 1, e.g., due to malfunction during charging and discharging operations of the electrode assembly 10. Accordingly, it may be possible reduce the risk of explosion of the rechargeable battery 1. The vent plate 34 may have notches having various structures inducing cutting so as to be rapidly cut under the predetermined internal pressure. When the internal pressure increases, the vent plate 34 may be cut starting from a notch.

The current collecting plates 51 and 52 may be respectively connected to the positive and negative electrode terminals 41 and 42 through sides thereof. The current collecting plates 51 and 52 may be respectively connected to the first and second uncoated regions 111 and 121 formed on both ends of the electrode assembly 10 through other sides, respectively. Thus, the current collecting plates 51 and 52 may connect the positive and negative electrodes 11 and 12 facing each other to the positive and negative electrode terminals 41 and 42, respectively.

Figure 8:
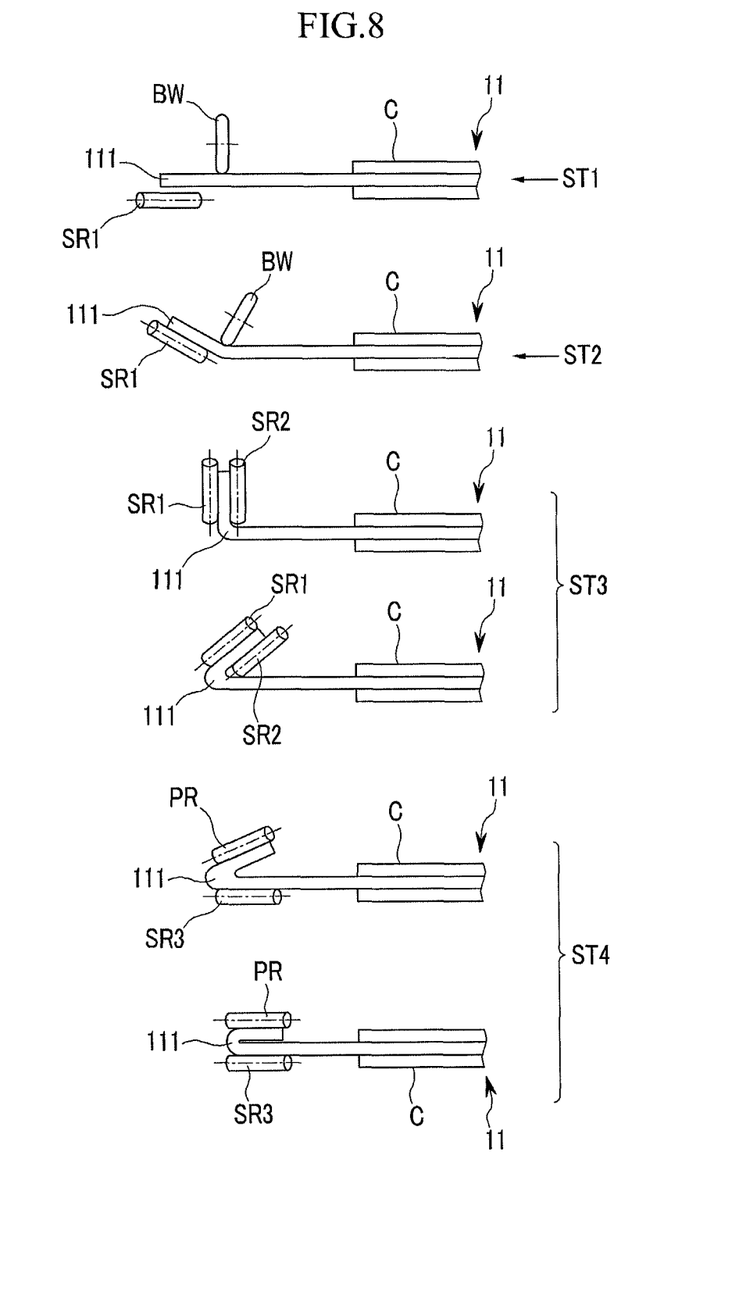
FIG. 8 illustrates stages in an operation of bending the uncoated region of the electrode.

FIG. 8 illustrates stages in an operation of bending the uncoated region of the electrode. Referring to FIG. 8, an example of forming the first and second uncoated regions 111 and 121 (for clarity, only the first uncoated region 111 is shown) may include bending the ends of the current collectors of the first and second uncoated regions 111 and 121 to form the first and second uncoated regions 111 and 121 having the thickness T2 greater than the thickness T1 of the current collector. This process may be performed in the first and second uncoated regions 111 and 121 of the positive and negative electrodes 11 and 12.

In the method of forming the uncoated region, the uncoated region may be shaped by gradually bending the current collector of the first uncoated region 111 of the supplied positive electrode 11 while a first operation ST1 to a fourth operation ST4 are sequentially performed. At the first operation ST1, the current collector of the first uncoated region 111 of the positive electrode 11 may progress between vertical bent wheels BW while being supported on a horizontal first support roll SR1 to display a bent part.

At the second operation ST2, in the bent part displayed by leaning the first support roll SR1 and the bent wheel BW to the inside of the positive electrode 11, the current collector of the first uncoated region 111 of the positive electrode 11 may be bent at up, e.g., toward a right angle. In FIG. 8, although the second operation ST2 is shown as a single operation, a plurality of operations of gradually changing the angles of the first support roll SR1 and the bent wheel BW so as to naturally bend the current collector of the first uncoated region 111 may be performed.

At the third operation ST3, the bent current collector of the first uncoated region 111 may progress between the first support roll SR1 and a second support roll SR2, and the first and second support rolls SR1 and SR2 may be gradually bent toward the inside of the positive electrode 11 to further bend the bent part.

At the fourth operation ST4, the bent current collector of the first uncoated region 111 may progress between a third support roll SR3 and a pressing roll PR, and the third support roll SR3 and the pressing roll PR3 may be gradually leaned to the inside of the positive electrode 11, such that the bent current collector of the first uncoated region may be overlapped with the current collector and brought into contact with each other.

In FIG. 8, the third and fourth operations ST3 and ST4 are shown as two operations, but may be performed by a plurality of states of gradually changing the angles between the first and second support rolls SR1 and SR2, and between the third support roll SR3 and the pressing roll PR, so as to naturally bend the current collector of the first uncoated region 111. In FIG. 8, the forming operation is illustrated as being performed on a coated electrode, i.e., the active material coating is present in the coated region C of the electrode 11. In another implementation, the active material coating may be formed after shaping the uncoated region, or at the same time as the shaping operation.

Figure 9:
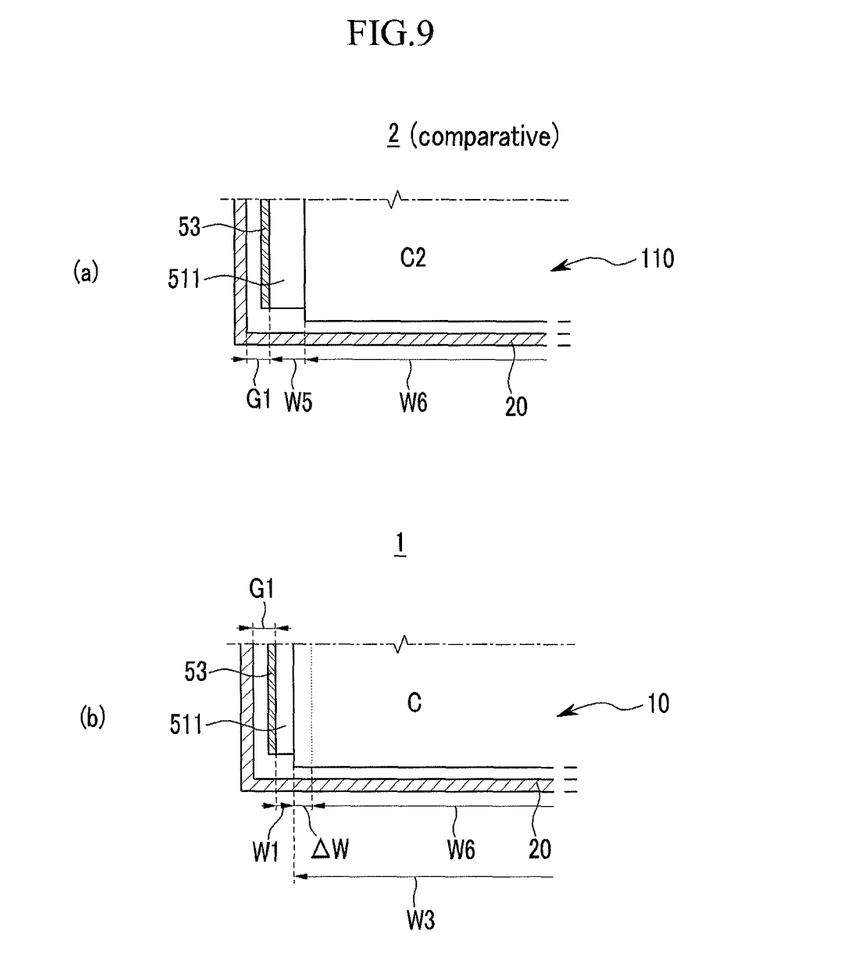
FIG. 9(a) illustrates a comparative electrode assembly housed in a case.
FIG. 9(b) illustrates an electrode assembly housed in a case according to an example embodiment.

FIG. 9(a) illustrates a comparative electrode assembly 110 housed in a case of a comparative rechargeable battery 2, and FIG. 9(b) illustrates an electrode assembly 10 housed in a case of a rechargeable battery 1 according to an example embodiment. For convenience, one electrode is primarily described.

Referring to FIG. 9(a), a coated region C2 of the electrode of the comparative rechargeable battery 2 has a width W6, and an uncoated region 511 of that electrode has a width W5. The uncoated region 511 has a thickness equal to the current collector of a positive electrode 11. In this case, a required gap G1 (set between the electrode assembly 110 and the inner surface of a case 20) is required. The width W5 of the uncoated region 511 is required at the time of laser-welding the uncoated region 511 and a current collecting plate 53 to each other.

In contrast, in FIG. 9(b), the rechargeable battery 1 according to the present example embodiment has a same required gap G1 as the comparative rechargeable battery 2. However, as the thickness T2 of the first uncoated region 111 may be increased larger than the thickness T1 of the current collector, the width W1 of the first uncoated region 111 may be decreased, relative to the width W5 of the general rechargeable battery 2, while implementing the same weldability as the general case. As a result, the width W3 of the coated region C coated with the active material may be increased in the rechargeable battery 1 according to the present example embodiment, relative to the width W5 of the comparative rechargeable battery 2. Thus, the first uncoated region 111 has the width W1 decreased by a change amount ΔW decreased from the required width W5 of the uncoated region 511 in the comparative rechargeable battery 2d (W1=W5−ΔW). The width W3 of the coated region C has a width W3 further increased by the change amount ΔW increased from the width W6 of the coated region C2 in the comparative rechargeable battery 2 (W3=W6+ΔW). Accordingly, the rechargeable battery 1 having high energy density may be implemented.

As described above, embodiments may provide a rechargeable battery improving the weldability between an electrode assembly and a current collecting plate. The rechargeable battery may have an uncoated region and a current collecting plate that are narrow while being welded to each other while they are closely bonded, i.e., welded, to each other in an electrode assembly.

The rechargeable battery may include an electrode assembly in which a positive electrode, a negative electrode, and a separator are wound, a case to house the electrode assembly, a cap plate coupled to the case and sealing an opening of the case, and a current collecting plate and an electrode terminal assembled to the cap plate and electrically connected to the electrode assembly. In order to implement a rechargeable battery of high-energy density in a case having limited space, an uncoated region may be minimally formed in an electrode having a predetermined area, and an active material should be coated as widely as possible. As the width of the uncoated region (which is not coated with the active material) and attached to the current collecting plate is decreased, it may be difficult to apply an existing ultrasonic bonding or laser welding method.

In the ultrasonic bonding method, a horn and an anvil may make contact with the uncoated region to transfer vibration energy to the uncoated region in order to bond the uncoated region and the current collecting plate. When the width of the uncoated region to be welded is not large enough, it may be difficult to weld the uncoated region and the current collecting plate to each other.

In the laser welding method, the uncoated region and the current collecting plate may be bonded to each other by irradiating a laser beam to the end of the uncoated region and the current collecting plate. Thus, even though the width of the uncoated region may be small, it may be possible to weld the uncoated region and the corrector collector. However, if a gap between the end of the uncoated region and the separator becomes narrow in the electrode assembly, the laser beam may pass through the electrode assembly to damage the separator, which is vulnerable to heat during welding. Further, the mass of the uncoated region (which is closely bonded to the current collecting plate) may be low, and it may be difficult to weld the current collecting plate and the uncoated region to each other with them closely bonded to each other. Thus, as described above in connection with example embodiments, an uncoated region (first and second uncoated regions) may have a thickness larger than a metal plate (first and second metal plates) in the electrode assembly. Accordingly, the mass of the uncoated region may be increased.

As described above, it may be possible to improve weldability between the uncoated region and the current collecting plate that are thicker. That is, it may be possible to weld the uncoated region and the current collecting plate while they are closely bonded to each other, and to prevent a separator from being damaged. Further, an area of a coated region coated with an active material may be increased while the width of the uncoated region is decreased, such that it is possible to implement a rechargeable battery of high energy density.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

<Description of symbols>

| | |
|---|---|
| 1, 2: Rechargeable battery | 10, 110: Electrode assembly |
| 11, 12: Positive, negative electrode | 13: Separator |
| 20: Case | 30: Cap plate |
| 32: Electrolyte solution inlet | 34: Vent plate |
| 35: Vent hole | |
| 41, 42: Positive, negative electrode terminal | |
| 43, 44: Outer, inner insulator | |
| 51, 52, 53: Current collecting plate | |
| 111, 121: First, second uncoated region | 311, 312: Terminal hole |
| BW: Bent wheel | C, C2: Coated region |
| G1: Required gap | ΔW: Change amount |
| S1, S2: Outer, inner surface | T1, T2: Thickness |
| SR1, SR2, SR3: First, second, third support roll | PR: Pressing roll |
| W1, W2, W3, W6: Width | W5: Required width |

What is claimed is:
1. A rechargeable battery, comprising:
at least three first electrodes, each of the first electrodes including a first metal plate, a first coated region where a first material is applied onto the first metal plates, and a first uncoated region, the first metal plates having a first thickness in the first uncoated regions and a second thickness in the first coated regions, the first thickness being greater than the second thickness, the first uncoated regions being formed by folding a part of all of the first metal plates at an outer end of the first uncoated region of each of the first metal plates, the folded part overlying an unfolded part in an overlapping face to face relationship;
a second electrode including a second metal plate, a second coated region where a second material is applied onto the second metal plate, and a second uncoated region;
a separator between the first electrodes and the second electrode;
a case housing the first electrodes, the separator, and the second electrode; and
a current collecting plate connected to the first uncoated regions through a side thereof.
2. The rechargeable battery as claimed in claim 1, wherein:
the first metal plates of the first coated regions are in a single layer, and the first metal plates of the first uncoated regions are in two layers.

3. The rechargeable battery as claimed in claim 1, wherein:
the first uncoated regions extend from the end of the first metal plates to the separator, and
the first uncoated regions are formed by a plurality of layers in which the first metal plates are folded into an overlapped condition.

4. The rechargeable battery as claimed in claim 1, further comprising at least three second electrodes each with a second metal plate, all of the second metal plates being folded at an outer end of a second uncoated region of each of the second metal plates.

5. The rechargeable battery as claimed in claim 1, wherein the first metal plates of the first uncoated regions are in plural layers that block a laser beam, irradiated during welding of the current collecting plate and the first uncoated regions, from damaging the separator, a single layer of an uncoated metal plate portion not being sufficient to block the laser beam to thereby facilitate reduction of a width of the first uncoated regions.

6. The rechargeable battery as claimed in claim 1, wherein a surface of the folded part is in contact with a surface of the unfolded part.

\* \* \* \* \*